United States Patent [19]
Jean

[11] Patent Number: 5,962,848
[45] Date of Patent: Oct. 5, 1999

[54] TYPE OF SCANNING DEVICE WITH UPGRADED RESOLUTION

[75] Inventor: Rone-Fue Jean, Hsin Chu Hsien, Taiwan

[73] Assignee: Microtek International Inc., Hsinchu, Taiwan

[21] Appl. No.: 08/931,987

[22] Filed: Sep. 17, 1997

[51] Int. Cl.$^6$ ............................................. H01J 3/14
[52] U.S. Cl. ................................. 250/234; 358/474
[58] Field of Search ................................. 250/234, 235, 250/236, 208.1; 358/474, 482, 483; 348/219

[56] References Cited

U.S. PATENT DOCUMENTS

| | | | |
|---|---|---|---|
| 4,641,038 | 2/1987 | Baker | 250/208.1 |
| 5,786,901 | 7/1998 | Okada et al. | 250/208.1 |

*Primary Examiner*—Edward P. Westin
*Assistant Examiner*—Kevin Pyo
*Attorney, Agent, or Firm*—Bacon & Thomas, PLLC

[57] ABSTRACT

Resolution of a scanner is upgraded by utilizing refraction to shift light rays incident on an image capture device by a small distance, thus capturing image data between picture elements of an original picture. The scanner includes a scanning platform arranged to support a scanned object, a scanning light source, an image capture mechanism having a lens and a CCD component arranged to capture light received from said light scanning light source after the light has scanned the object on the scanning platform, and a light refracting component having a moving end and a fulcrum end, the light refracting component being pivotably interposed between the scanning platform and the image capture mechanism. An electro-magnet mechanism is arranged to attract the moving end of the refractive component and thereby pivot the component about its fulcrum end. The consequent pivoting of the light refracting component varies the amount by which the light refracting component refracts and thereby shift the light captured by the lens and CCD component. A counterweight can be added at the fulcrum end to minimize the energy necessary to move the component.

3 Claims, 4 Drawing Sheets

TYPE OF SCANNING DEVICE WITH UPGRADED RESOLUTION

BACKGROUND OF THE INVENTION

The subject invention relates to a type of scanning device with upgraded resolution, particularly to one that can obtain images with a higher resolution than the CCD sensor.

DESCRIPTION OF PRIOR ART

Conventionally, the prior art of image resolution multiplication method used for a CCD generally involves software programming, but either by differential method or functional proximity method, the purpose of multiplied resolution could not be achieved effectively.

Generally, there is a small obstructed gap between neighboring cells of a CCD, so in the actual scanning process, the image data in the small obstructed gap between the cell could not be read, so the quality of the image is adversely affected. Even though software programs have been utilized to compensate for this problem, it could not be completely overcome.

THE PROBLEM TO BE SOLVED BY THE SUBJECT INVENTION

As a result of this issue, the subject inventor has devoted a great deal of time to the study of the problem, with technical applications, and has presented the subject invention that will upgrade a low-resolution CCD (e.g. 300 dpi), with the assistance of other mechanism, so the scanner can obtain higher resolution (600 dpi, 900 dpi).

SUMMARY OF THE INVENTION

The primary purpose of the subject invention is to provide a type of scanning device with upgraded resolution, utilizing glass refraction principles on light rays, so the light ray of the scanned object are shifted by half a picture element, thus obtaining the image data from between respective picture elements of the original picture.

To provide a better understanding of the purpose, configuration, structure or installation characteristics of the subject invention, the following example of preferred embodiment is described in detail:

DETAILED DESCRIPTION OF PREFERRED EMBODIMENT

Figure 1:
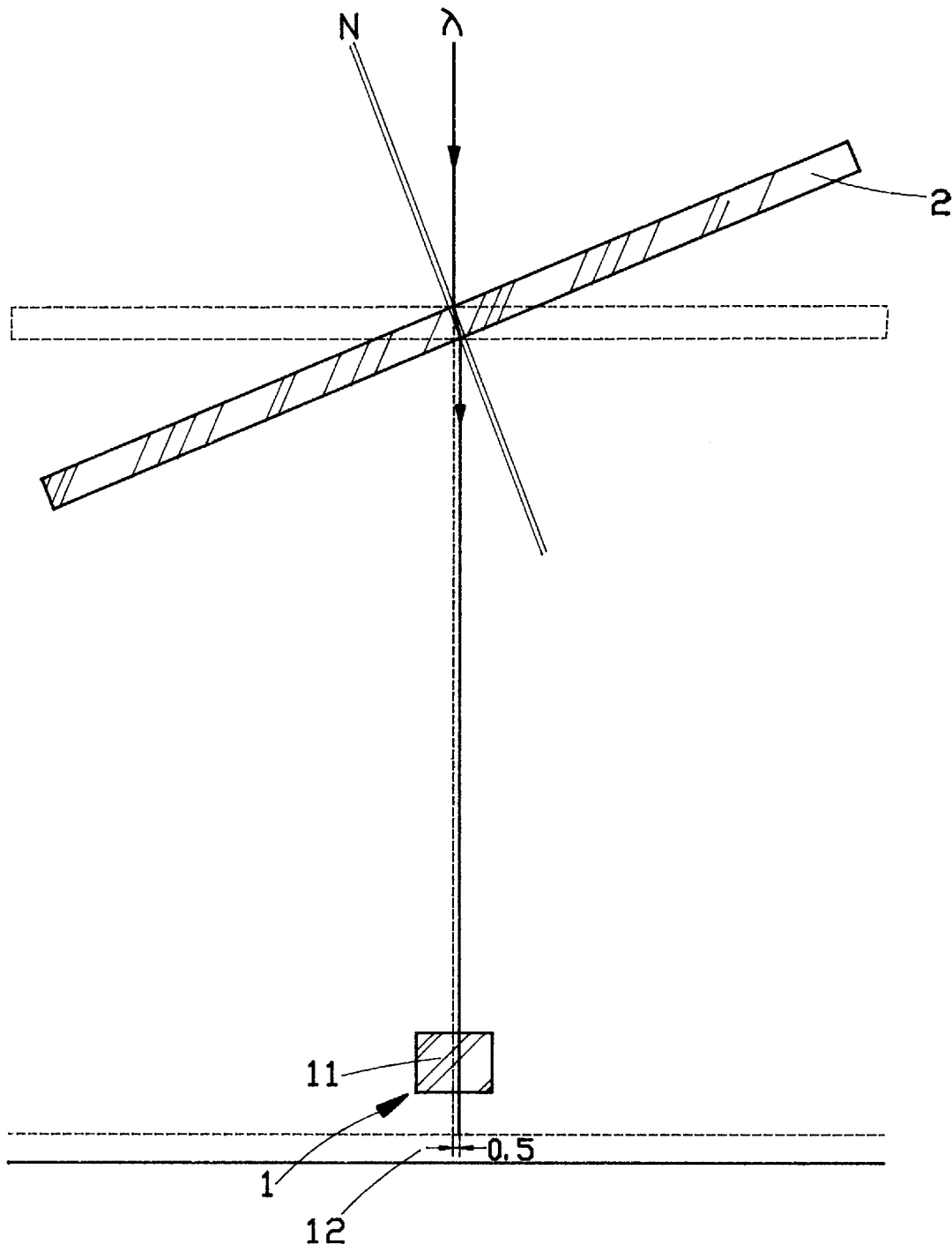
FIG. 1 is an illustration of incident light which has been shifted by refraction a distance of one half image point.
Figure 2:
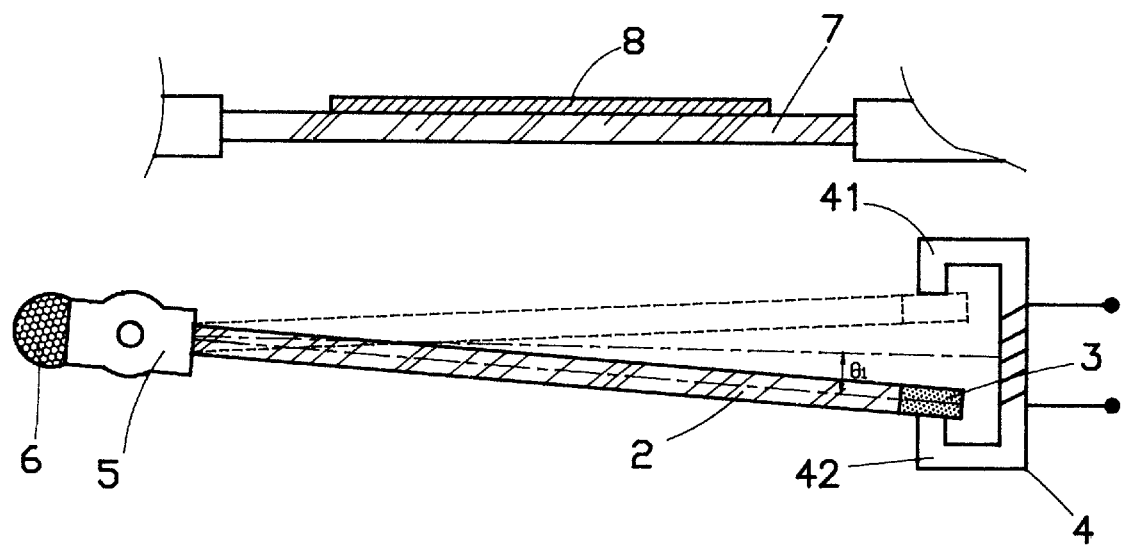
FIG. 2 is an illustration of the subject invention.
Figure 2:
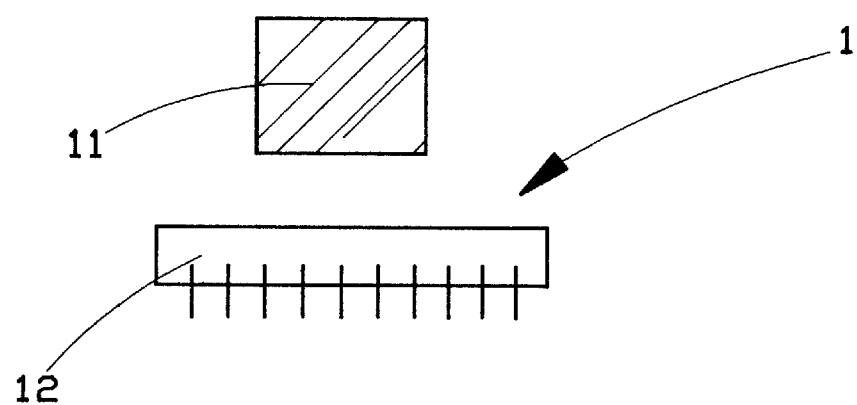

Please refer to FIG. 1 and 2. The subject invention relates to a scanning device or scanner with upgraded resolution, whereby based on the theory of light ($\lambda$) refraction by a glass, the light rays from the scanned object are shifted by a half (0.5) image point, to obtain the image data from between the points of the original image.

The scanner comprises a scanning platform 7, an image capture mechanism including a lens unit 11 and CCD 12, a light polarizing glass 2 and a electromagnet mechanism 4, wherein the polarizing glass 2 is interposed between the image capture mechanism 1 and the scanning platform 7. The light polarizing glass has a permanent magnet 3 at moving end and an counterweight 6 at the other end and is pivoted or rotated about fulcrum 5. The scanned object 8 is positioned on top of the scanning platform 7. The electromagnet mechanism 4 is positioned corresponding to the permanent magnet 3. The electromagnet 4 has an upper end 41 and a lower end 42 and the permanent magnet 3 is located between the upper end 41 and lower end 42. The counterweight 6 serves to balance the clockwise torque on the light polarizing glass 2, so the electro-magnet mechanism 4 could move the polarizing glass 2 with minimal energy.

When the electromagnet mechanism 4 is subjected to a positive-direction current, the lower end 42 of the electromagnet mechanism 4 attracts the permanent magnet 3 and the upper end 41 of the electromagnet mechanism 4 repels the permanent magnet 3. Then, the right end of the polarizing glass 2 will be lowered by a distance of 5 mm below the horizontal level, and the incident light ray will be shifted as a result of refraction by a distance of 0.02 mm to the left.

Conversely, if the electromagnet mechanism 4 is subjected to a negative-direction current, the upper end 41 of the electromagnet mechanism 4 attracts the permanent magnet 3 and the lower end 42 of the electromagnet 42 mechanism 4 repels the permanent magnet 3. Then, the right end of the polarizing glass 2 will move upward to 5 mm above the horizontal level, and the incident light ray will be shifted by a distance of 0.02 mm to the right.

Summing the shifting of the translation distance of the incident light ray, when the polarizing glass 2 moves from 5 mm below the horizontal level to 5 mm above the horizontal level, the incident light has translated a total distance of 0.02+0.02=0.04 mm, or the equivalent of 1/600 inch.

Figure 3:
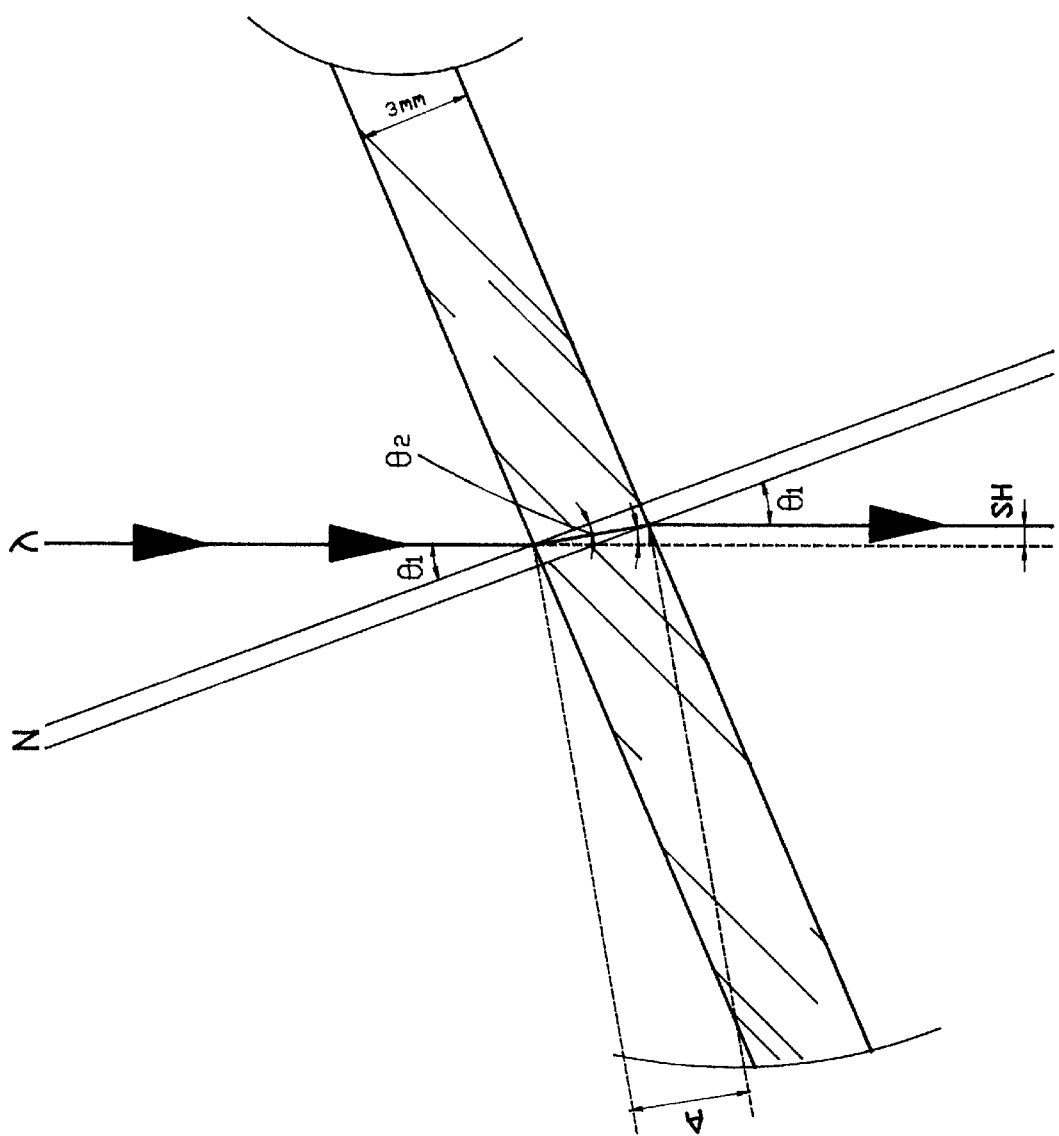
FIG. 3 is a side view of the incident light through a glass showing the angles of refraction.

Suppose the glass reflection rate at (n1)=1.5; and the air reflection rate at (n2)=1; the thickness of polarizing glass= 3mm. If the translation of incident light is desired at a half picture element (Pixel), for example 1/300 inch for a resolution of 300 dpi, then the translation of the incident light should be 1/600 (inch)=0.042333 (mm). The diagram of translation, is shown in FIG. 3, wherein;

θ1 indicates the included angle of incident ray and normal line N;

θ2 indicates the included angle of reflected ray and normal line N;

$$\cos\theta 2 = \frac{3\ mm}{A} \Rightarrow \therefore A = \frac{3}{\cos\theta 2}\ mm \qquad (1)$$

$$\sin(\theta 1 - \theta 2) = \frac{SH}{A} \Rightarrow \therefore SH = A \times \sin(\theta 1 - \theta 2) \qquad (2)$$

Substituting (1) into (2), we get:

$$SH = \frac{3}{\cos\theta 2} \times \sin(\theta 1 - \theta 2) \qquad (3)$$

From the refraction formula, we get:

$$n1 \times \sin\theta 1 = n2 \times \sin\theta 2 \ \Theta n1=1,\ n2=1.5\ \therefore \sin\theta 1=1.5 \times \sin\theta 2 \qquad (4)$$

To cite a detailed example by way of explanation, suppose the scanning scope is an A4 size, with a width of 210 mm.

Since the width of the glass must be larger than that of the scanning scope, we take the length in this example as 250 mm. When the right end of the polarizing glass 2 is raised by 5 mm, the included angle of said polarizing glass and the horizontal line θ1 (same as the above θ1) is $\sin^{-1}$ 5/250≈1.146°. Substitute this value in formula (4), and we get θ2≈20.764°. Substitute again θ1, θ2 in formula (3), and we get SH≈0.02 mm. In the same way, if the right end of the polarizing glass 2 is to be lowered 5mm below the horizontal level, then the incident ray should be translated 0.02 mm to the left.

Figure 4:
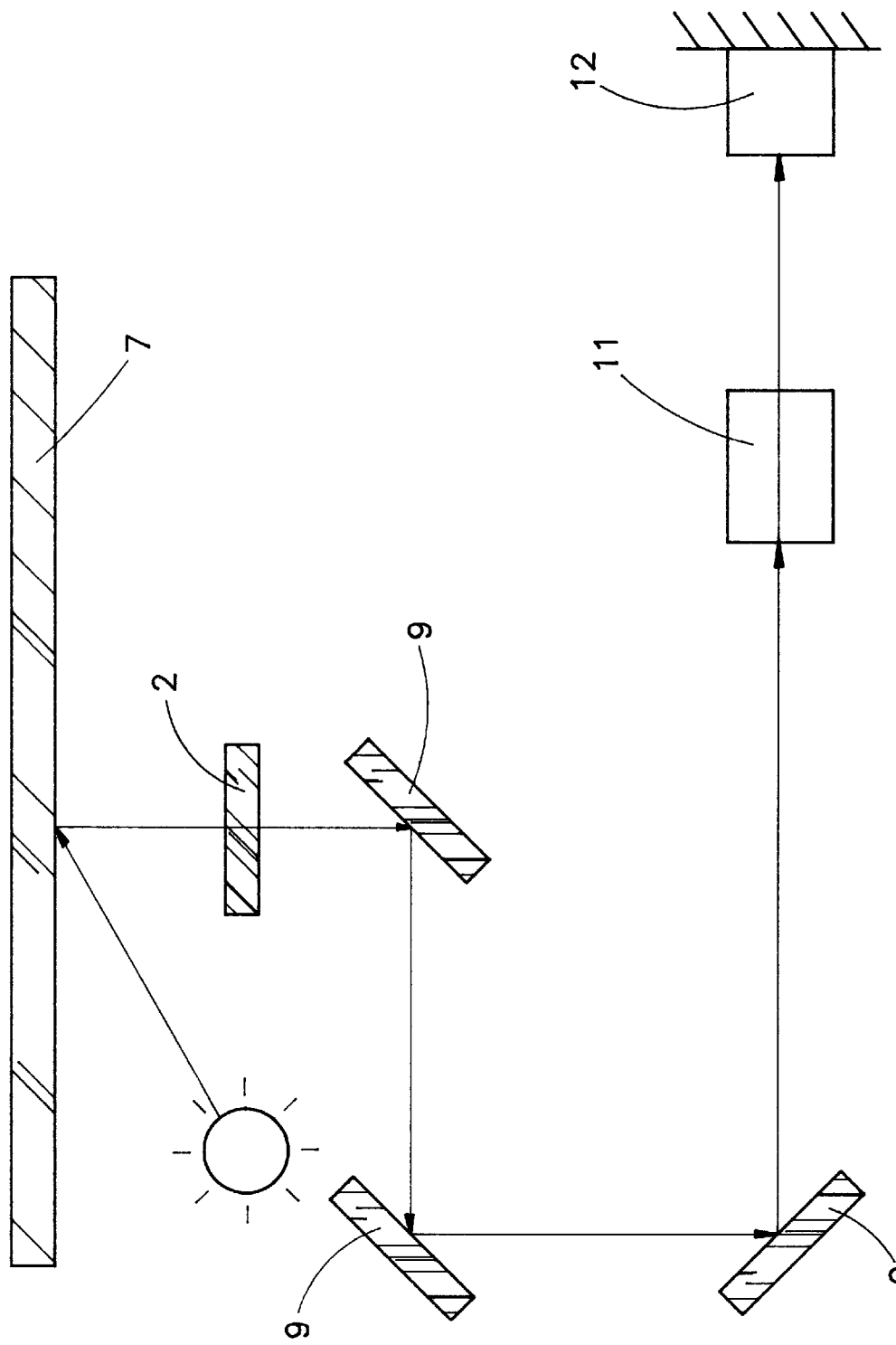
FIG. 4 is an illustration of another example of embodiment of the subject invention.

Referring to FIG. 4, the polarizing glass 2 is placed on a moving carriage (not shown in drawing), moving with the capture mechanism, so that it will save polarizing glass 2 material, requiring only a strip of glass rather than a glass with a large area.

In summary, the subject invention of a scanner device with upgraded resolution, utilizes the refractive properties of glass to shift the light ray of a scanned object by a half picture element, in order to obtain the image data between image points of the original picture.

It is hereby declared that the above description, covering the preferred embodiment, shall not be used to limit or restrict the subject claim, and that all equivalent structural and/or configurational variations and/or modifications made by anyone skilled in the subject art, deriving from the subject description with drawings and contents therein, should reasonably be included in the intent of the subject invention and the subject claim.

I claim:

1. A scanner in which resolution is upgraded by utilizing refraction to shift light rays from a scanned object by a small distance, thus capturing image data between picture elements of an original picture; comprising:

a scanning platform arranged to support a scanned object;

a scanning light source;

an image capture mechanism having a lens and a CCD component arranged to capture light received from said light scanning light source after the light has scanned the object on the scanning platform;

a light refracting component having a moving end and a fulcrum end, said light refracting component being pivotably interposed between said scanning platform and said image capture mechanism; and an electro-magnet mechanism arranged to attract said moving end and thereby pivot said light refracting component about said fulcrum end, whereby rotation of the light refracting component to vary an amount by which said light refracting component refracts and thereby shifts the light captured by the lens and CCD component.

2. A scanner as claimed in claim 1, wherein said light refracting component is a sheet of transparent glass having a permanent magnet at said moving end, said permanent magnet being attracted by said electromagnet mechanism to pivot said light refracting component.

3. A scanner as claimed in claim 1, wherein said light refracting component has a counterweight at said fulcrum end, said counterweight being arranged to balance a torque on said refracting element so that the electromagnet mechanism moves said refracting element with minimum energy.

\* \* \* \* \*